United States Patent
Tan, Jr.

(10) Patent No.: US 8,489,896 B2
(45) Date of Patent: *Jul. 16, 2013

(54) DIGITAL IDENTITY DEVICE

(75) Inventor: Aureliano Tan, Jr., Sugar Land, TX (US)

(73) Assignee: Integrated Information Solutions, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,213

(22) Filed: Nov. 18, 2011

(65) Prior Publication Data

US 2012/0066514 A1    Mar. 15, 2012

Related U.S. Application Data

(63) Continuation of application No. 13/208,035, filed on Aug. 11, 2011, which is a continuation of application No. 12/350,139, filed on Jan. 7, 2009, now Pat. No. 8,020,008, which is a continuation of application No. 09/658,387, filed on Sep. 8, 2000, now Pat. No. 7,493,497.

(60) Provisional application No. 60/179,989, filed on Feb. 3, 2000.

(51) Int. Cl.
    *G06F 11/30* (2006.01)

(52) U.S. Cl.
    USPC ............................................ 713/189

(58) Field of Classification Search
    USPC .. 713/164, 165, 167, 190, 193, 189; 380/277, 380/286; 726/5, 29
    See application file for complete search history.

(56) References Cited

U.S. PATENT DOCUMENTS

| | | | |
|---|---|---|---|
| 4,961,142 A * | 10/1990 | Elliott et al. | 705/73 |
| 5,237,610 A | 8/1993 | Gammie et al. | |
| 5,343,524 A | 8/1994 | Mu et al. | |
| 5,473,692 A | 12/1995 | Davis | |
| 5,550,981 A | 8/1996 | Bauer et al. | |
| 5,623,637 A | 4/1997 | Jones et al. | |
| 5,675,825 A | 10/1997 | Dreyer et al. | |
| 5,689,560 A | 11/1997 | Cooper et al. | |
| 5,774,544 A | 6/1998 | Lee et al. | |
| 5,781,723 A | 7/1998 | Yee et al. | |
| 5,790,677 A | 8/1998 | Fox et al. | |
| 5,857,024 A | 1/1999 | Nishino et al. | |
| 5,917,913 A | 6/1999 | Wang | |
| 6,014,748 A * | 1/2000 | Tushie et al. | 726/9 |

(Continued)

FOREIGN PATENT DOCUMENTS

| | | |
|---|---|---|
| EP | 0907270 A2 | 4/1999 |
| JP | 11-259163 A | 9/1999 |

(Continued)

OTHER PUBLICATIONS

Friedman, Gary L., The Trustworthy Digital Camera: Restoring Credibility to the Photographic Image, IEEE, Sep. 2, 1993 (6 pages).

(Continued)

*Primary Examiner* — Beemnet Dada
(74) *Attorney, Agent, or Firm* — Osha Liang LLP

(57) ABSTRACT

A digital identity device for uniquely identifying legal entities. The digital identity device is used for secure electronic communications.

15 Claims, 15 Drawing Sheets

U.S. PATENT DOCUMENTS

| | | | |
|---|---|---|---|
| 6,016,349 | A | 1/2000 | Musa |
| 6,021,494 | A | 2/2000 | Bolan et al. |
| 6,026,166 | A | 2/2000 | LeBourgeois |
| 6,044,469 | A | 3/2000 | Horstmann |
| 6,065,113 | A * | 5/2000 | Shiell et al. ............ 712/227 |
| 6,083,771 | A | 7/2000 | Ward et al. |
| 6,111,504 | A | 8/2000 | Packard et al. |
| 6,111,506 | A | 8/2000 | Yap et al. |
| 6,141,696 | A | 10/2000 | Goertzel et al. |
| 6,199,761 | B1 | 3/2001 | Drexler |
| 6,273,334 | B1 | 8/2001 | Ijichi et al. |
| 6,366,950 | B1 | 4/2002 | Scheussler et al. |
| 6,401,206 | B1 | 6/2002 | Khan et al. |
| 6,463,537 | B1 | 10/2002 | Tello |
| 6,516,416 | B2 | 2/2003 | Gregg et al. |
| 6,567,915 | B1 | 5/2003 | Guthery |
| 6,575,372 | B1 * | 6/2003 | Everett et al. ............ 235/492 |
| 6,711,683 | B1 | 3/2004 | Laczko, Sr. et al. |
| 6,745,328 | B1 | 6/2004 | Searle |
| 6,847,948 | B1 | 1/2005 | Paolini et al. |
| 6,873,975 | B1 | 3/2005 | Hatakeyama et al. |
| 6,952,770 | B1 | 10/2005 | Mittal et al. |
| 6,954,753 | B1 | 10/2005 | Jeran |
| 7,461,249 | B1 | 12/2008 | Pearson et al. |
| 7,493,497 | B1 * | 2/2009 | Tan, Jr. ............ 713/189 |
| 8,020,008 | B2 * | 9/2011 | Tan, Jr. ............ 713/189 |
| 2001/0032885 | A1 | 10/2001 | Groeger |
| 2002/0002688 | A1 | 1/2002 | Gregg et al. |
| 2002/0128975 | A1 | 9/2002 | Klemba et al. |
| 2002/0161709 | A1 | 10/2002 | Floyd et al. |
| 2003/0046589 | A1 | 3/2003 | Gregg |
| 2005/0033974 | A1 | 2/2005 | Ansell et al. |
| 2005/0044423 | A1 | 2/2005 | Mellmer et al. |
| 2010/0280948 | A1 | 11/2010 | Cohen |

FOREIGN PATENT DOCUMENTS

| | | |
|---|---|---|
| JP | 2000-181561 A | 6/2000 |
| WO | 97/29416 A2 | 8/1997 |
| WO | 98/39876 A1 | 9/1998 |

OTHER PUBLICATIONS

Ivey, P., Cox, A., Harbridge, J., and Oldfield, J.; "A Single Chip Public Key Encryption Sub-System," British Telecom Research Laboratories, 1988 (4 pages).

Gasser, M., and Lipner, S.B.; "Secure System Development unb Industry: A Perspective from Digital Equipment," IEEE 1988 (5 pages).

Roe, M., and Casey, T.; "Integrating Cryptography in the Trusted Computing Base," IEEE 1990 (7 pages).

Fabian, W.; "Physical Access to Computers: Can Your Computer Be Trusted?," IEEE 1995 (8 pages).

Hartfiel, J.W. And Stahler, F.R.; "Microprocessor Identifier," IBM Technical Disclosure Bulletin, Jan. 1995 (3 pages).

Yadav, S., Yavatkar, R., Pabbati, R., Ford, P., Moore, T., and Herzog, S; "Identity Representation for RSVP," the Internet Society, Jan. 2000 (15 pages).

Pfitzmann, A., Pfitzmann, B., Schunter, M., and Waidner, M.; "Trusting Mobile User Devices and Security Modules," IEEE, Feb. 1997 (8 pages).

Cordonnier, V.M.; "Smart Cards: Present and future applications and techniques," Electronics & Communication Engineering Journal, Oct. 1991 (6 pages).

Paradinas, P. And Vandewalle, J.; "A Personal and Portable Database Server: the CQL Card," 1994.

Trusted Computing Platform Alliance, "Trusted Subsystem Specification V0.90," Trusted Computing Group, Aug. 2000 (208 pages).

Garfinkel, S. And Spafford, G.; "Web Security, Privacy and Commerce, Second Edition," O'Reilly Media, Inc., Cambridge, U.S.A., 2002 (756 pages).

Schneier, B.; "Applied Cryptography Second Edition: protocols, algorithms and source code in C;" John Wiley & Sons, Inc., New York, U.S.A., 1996 (758 pages).

* cited by examiner

DIGITAL IDENTITY DEVICE

CROSS REFERENCE TO RELATED APPLICATIONS

This application claims benefit under 35 U.S.C. §120 to and is a continuation of U.S. patent application Ser. No. 13/208,035 filed on Aug. 11, 2011. U.S. patent application Ser. No. 13/208,035 claims benefit under 35 U.S.C. §120 to and is a continuation of U.S. Pat. No. 8,020,008 issued on Sep. 13, 2011. U.S. Pat. No. 8,020,008 claims benefit under 35 U.S.C. §120 to and is a continuation of U.S. Pat. No. 7,493,497 issued on Feb. 17, 2009. U.S. Pat. No. 7,493,497 claims the priority under 35 U.S.C. §119(e) to U.S. Provisional Patent Application Ser. No. 60/179,989, filed on Feb. 3, 2000. The disclosures of all of the aforementioned patents and applications are hereby incorporated by reference in their entirety.

BACKGROUND OF THE INVENTION

The present invention relates generally to the privacy and security of digital information, and in particular to the privacy and security of electronic communication.

In electronic communication, the authentication of the parties involved is generally required. Each party should be clearly identifiable and distinguishable. The electronic communication between parties should also be secure. The parties should also be able to grant various levels of permission for access to their respective information.

What is needed is a method of identifying microprocessors and using this method of microprocessor identification in a digital identity device for entities to use in electronic communications.

SUMMARY OF THE INVENTION

The present invention is a microprocessor identity device for use in a digital identity device. The digital identity device will contain identity information that will function with the microprocessor identity device to create a unique digital identity for all individuals or corporations.

According to one aspect of the invention, a digital identity device for identifying individuals includes a microprocessor identity device, a digital identity, and means for binding the microprocessor identity device to the digital identity.

According to another aspect of the invention, an apparatus for globally registering digital identity devices includes one or more digital identity devices, a database of digital identity device information, and means for communications between the digital identity devices and the database.

According to another aspect of the invention, a method of licensing a software program to a computer, the computer having a microprocessor containing identity information about the computer, includes the steps of starting the installation of the software program to the computer, transmitting a license key and the identity information about the computer to a central database, receiving information to bind the license key to the identity information, binding the license key to the identity information in the computer, and completing the installation.

According to another aspect of the invention, a method of licensing a software program to a computer, the computer having a microprocessor containing identity information about the computer, includes the steps of receiving a license key and the identity information about the computer into a central database, transferring a status of the license key and the identity information in the central database to the computer, accepting the license key and the identity information, and binding the license key to the identity information in the central database.

According to another aspect of the invention, a method of de-licensing a software program to a computer, the computer having a microprocessor containing identity information about the computer, includes starting the de-installation of the software program to the computer, transmitting a license key and the identity information about the computer to a central database, receiving information to unbind the license key to the identity information, unbinding the license key to the identity information in the computer, and completing the reinstallation.

According to another aspect of the invention, a method of de-licensing a software program to a computer, the computer having a microprocessor containing identity information about the computer, includes receiving a license key and the identity information about the computer into a central database, transferring a status of the license key and the identity information in the central database to the computer, accepting the license key and the identity information, and unbinding the license key to the identity information in the central database.

According to another aspect of the invention, a method of tracking software usage by a computer, the computer having a microprocessor containing identity information about the computer, includes receiving a usage profile from the computer and storing the usage profile in a central database.

DETAILED DESCRIPTION OF THE PREFERRED EMBODIMENT

Figure 1:
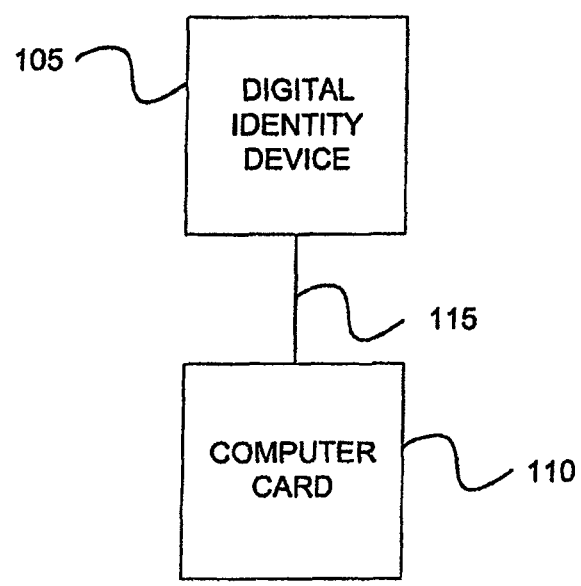
FIG. 1 is a schematic view illustrating an embodiment of a system for a digital identity device.

To assist in this detailed description a glossary of terms and acronyms follows:

authentication the ability of the receiver of a message to positively identity the author of the message digital signature a digital code that can be attached to an electronically transmitted message that uniquely identifies the sender e-mail electronic mail GRID global registry of digital identity devices I/O input/output integrity the guarantee that a message has not changed in the process of transmission license key an encrypted code that grants permission to use a software program on a fixed amount of computers non-repudiation the inability of the author of a message to deny sending the message NVRAM non-volatile random access memory PCI peripheral component interconnect PCMCIA personal computer memory card international association PDA personal digital assistant PROM programmable read-only memory RISC reduced instruction set computer UID universal identity card USB universal serial bus VME VersaModule Eurocard Referring to FIG. 1, a system 100 for digitally identifying individuals or corporations includes a digital identity device 105 (further illustrated in FIG. 2), a computer card 110, and a connection 115. The connection 115 couples the digital identity device 105 to the computer card 110.

The digital identity device 105 contains the identity information of either an individual or a corporation. The digital identity device 105 contains one or more passwords. The passwords are encrypted.

The computer card 110 contains the digital identity device 105. The computer card 110 has input/output capabilities for a connection to a separate computer. The computer card 110 is a computer board. In an alternate embodiment, the computer card 110 is a standard computer card which can be plugged to a computer bus or any computer device with an input/output port. In an alternate embodiment, the computer card 110 displays the identity information within the digital identity device 105. Some examples of the computer card 110 are a Personal Computer Memory Card International Association (PCMCIA) card, a PCI card for a personal computer, an Sbus card for a Sun Microsystems computer, a VME card, a Multibus card or any card that attaches to a Universal Serial Bus (USB), to a FireWire, or to another computer input/output (I/O) port.

The connection 115 couples the digital identity device 105 to the computer card 110. The connection 115 is solder. In an alternate embodiment, the connection 115 is connector pins. The connection 115 depends on the computer card 110 of the system 100. In an alternate embodiment, the digital identity device 105 is also soldered to other discrete components on a printed circuit of the computer card 110.

In an alternate embodiment, the digital identity device 105 is a Universal Serial Bus (USB) device. The connection 115 couples the digital identity device 105 into the USB port of a separate computer. The computer card 110 is optional.

Figure 2:
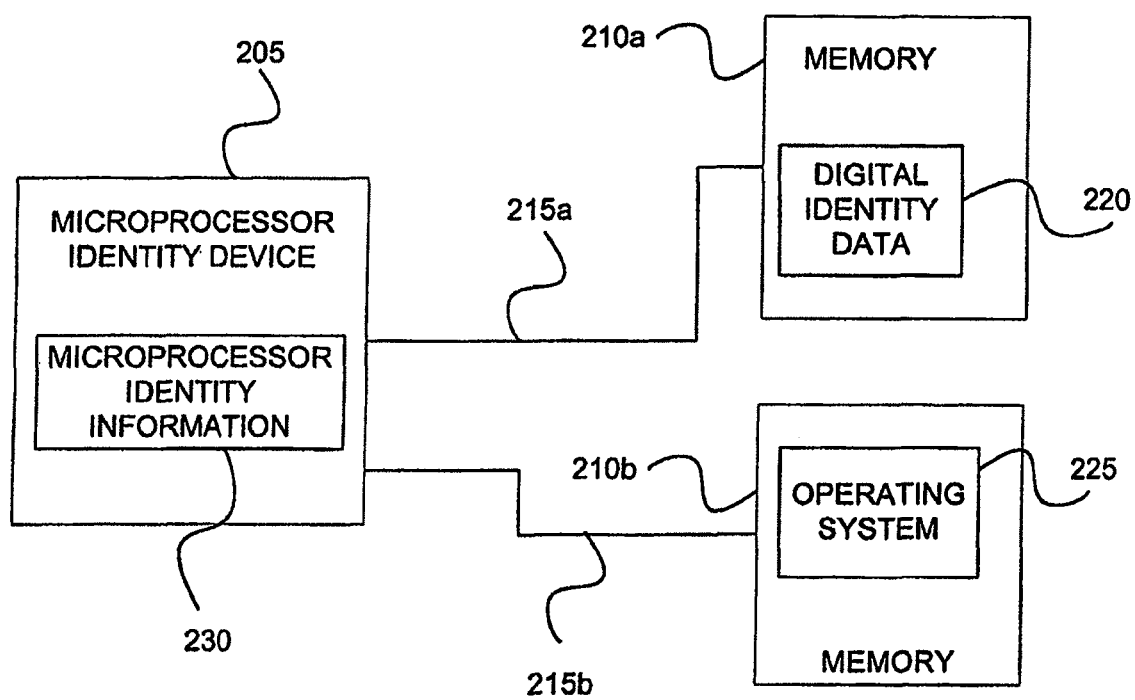
FIG. 2 is a schematic view illustrating an embodiment of the digital identity device of FIG. 1.

Referring to FIG. 2, the digital identity device 105 includes a microprocessor identity device 205 (further illustrated in FIG. 4), one or more memories 210, and one or more communication interfaces 215. The communication interfaces 215 couple the microprocessor identity device 205 to the memories 210.

The microprocessor identity device 205 includes microprocessor identity information 230. The microprocessor identity information 230 distinguishes the microprocessor identity device 205 from other microprocessors in the world. The microprocessor identity information 230 is unique to the microprocessor identity device 205. The microprocessor identity information 230 consists of one-hundred-twenty-eight (128) bits of information. The microprocessor identity information 230 is a combination of a six (6) character code of the manufacturer (the company's stock ticker symbol, if a public company), a three character city airport code of the place of manufacture, a time (consisting of the month, day, year, hour, minute, second, millisecond) of manufacture, and extra bits for encryption purposes. In an alternate embodiment, the microprocessor identity information 230 consists of two-hundred-fifty-six (256) bits of information. In an alternate embodiment, the microprocessor identity information 230 is a mathematically generated number or a series of alphanumeric characters that satisfy certain encryption criteria. In an alternate embodiment, the microprocessor identity information 230 consists of even multiples of the microprocessor identity device 205 register length.

The memories 210 are any commercially available memory, such as non-volatile random access memory (NVRAM). The memories 210 are non-volatile when the power to the system 100 is turned off, but are electrically erasable. There is a first memory 210a and a second memory 210b. The first memory 210a includes digital identity data 220. The digital identity data 220 is etched onto the first memory 210a using any conventional etching method. The digital identity data 220 is for an individual or a corporation. The digital identity data 220 includes one or more of the following: a name, a digital picture, an address, a date of birth, a social security number, a driver's license number, a digital photograph, a digital thumb print, a DNA code, one or more credit cards' information, one or more bank accounts' information, an incorporation name, a date and a place of incorporation, one or more corporate officers, one or more corporate partners, or one or more D.B.A. names.

The second memory 210b includes an operating system 225. The operating system 225 binds the digital identity data 220 to the microprocessor identity device 205 by encoding the digital identity data 220 with passwords input by an owner of the digital identity device 105. The digital identity data 220 is encoded by an algorithm that uses the microprocessor identity information 230. The operating system 225 is secure by using commercially available encryption methods. In an alternate embodiment, the operating system 225 encrypts and stores other types of information in the memories 210. This information may be, for example, the digital identity device 105 owner's medical information or the digital identity device 105 owner's medical history. The operating system 225 also validates one or more passwords of the digital identity device 105, and one or more external systems 100 which request information from the digital identity device 105. The operating system 225 also authenticates the digital identity device 105 to the external systems 100. The operating system 225 also regulates the flow of information to and from the digital identity device 105. In an alternate embodiment, the operating system 225 is programmed to perform functions within the capabilities of the microprocessor identity device 205 of the digital identity device 105.

The microprocessor identity information 230 is bound to the digital identity data 220 by the operating system 225. The microprocessor identity information 230 provides a shortcut reference to the digital identity data 220 of the digital identity device 105. The microprocessor identity information 230 is used in the validation and authentication of external systems 100 to secure the privacy of electronic data exchange and transactions of the system 100. The microprocessor identity information 230 serves as a surrogate for the digital identity data 220. The microprocessor identity information 230 tags all electronic transmissions with regard to the microprocessor identity device 205.

The communication interfaces 215 couple the memories 210 to the microprocessor identity device 205, via one or more printed circuits on the computer card 110. The communication interfaces 215 include address, data, and control electrical lines. There is a first communication interface 215a and a second communication interface 215b. The first communication interface 215a couples the first memory 210a to the microprocessor identity device 205. The second communication interface 215b couples the second memory 210b to the microprocessor identity device 205.

To extract the identity of the system 100, an "Identity" or similar instruction is issued to the microprocessor identity device 205. The microprocessor identity device 205 responds by returning the microprocessor identity information 230. The microprocessor identity information 230 is returned in two or four registers. The microprocessor identity information 230 is retrieved using a single instruction or command.

In an alternate embodiment, the microprocessor identity device 205 is a component of a computer. The microprocessor identity device 205 identifies the computer where it resides. The microprocessor identity device 205 acts as a property tag of the computer. The microprocessor identity device 205 may also act as a property tag for other components of the computer, for example, a hard disk, a zip drive, and a sound card. The content of the components are encrypted with the microprocessor identity information 230. The integrity of the computer is set up using a security structure defined by the operating system of the computer. The operating system of the computer allows the components of the computer to work together.

Figure 3:
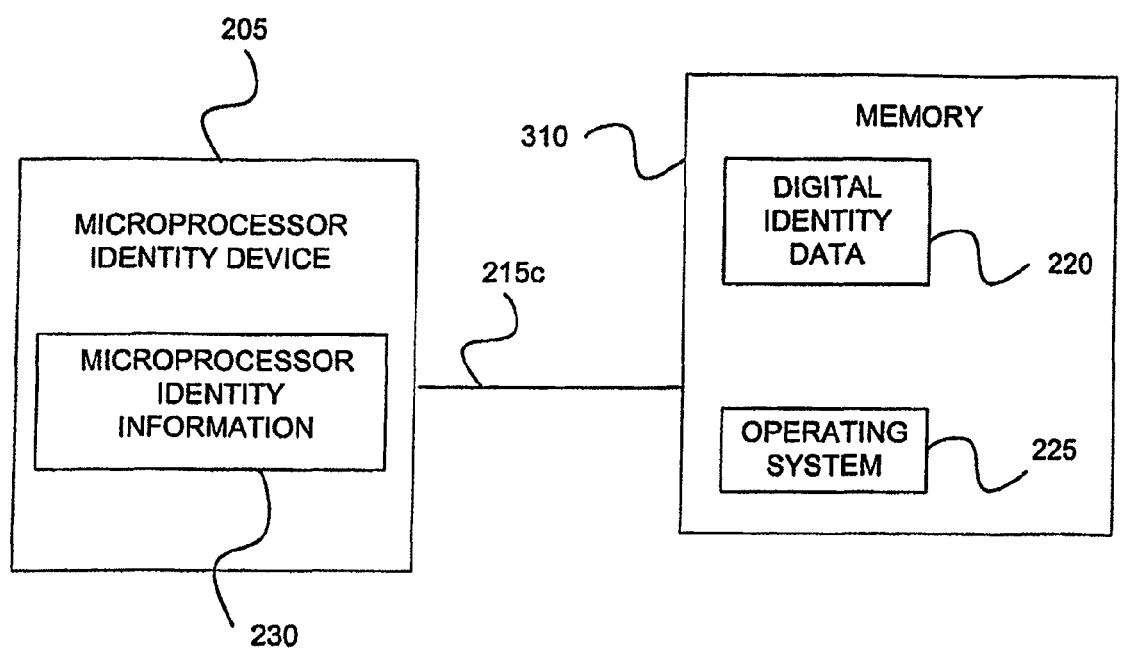
FIG. 3 is a schematic view illustrating an alternate embodiment of the digital identity device of FIG. 1.

Referring to FIG. 3, in an alternate embodiment, the digital identity device 105 includes the microprocessor identity device 205, a memory 310, and a communication interface 215c. The memory 310 is erasable and non-volatile to store information when the power is off to the system 100. The memory 310 is any commercially available NVRAM memory. The memory 310 includes the digital identity data 220 and the operating system 225. The digital identity data 220 is etched onto the memory 310 by an external microprocessor. The communication interface 215c electrically couples the memory 310 to the microprocessor identity device 205 through one or more printed circuits, etched on the computer card 110.

In an alternate embodiment, the memory 310 is external to a housing of the microprocessor identity device 205. The memory 310 is, for example, the Sony memory stick available from Sony, Inc. The contents of the memory 310 are encrypted using the microprocessor identity information 230 as a parameter of encryption. The contents of the memory 310 are secure and can only be read by authorized digital identity devices 105.

In an alternate embodiment, the digital identity device 105 is a single computer chip. The digital identity device 205 houses the microprocessor identity device 205 with the microprocessor identity information 230. The digital identity device 205 also houses the memory 310 with the digital identity data 220. The digital identity device 205 also houses the memory 310 with the operating system 225.

Figure 4:
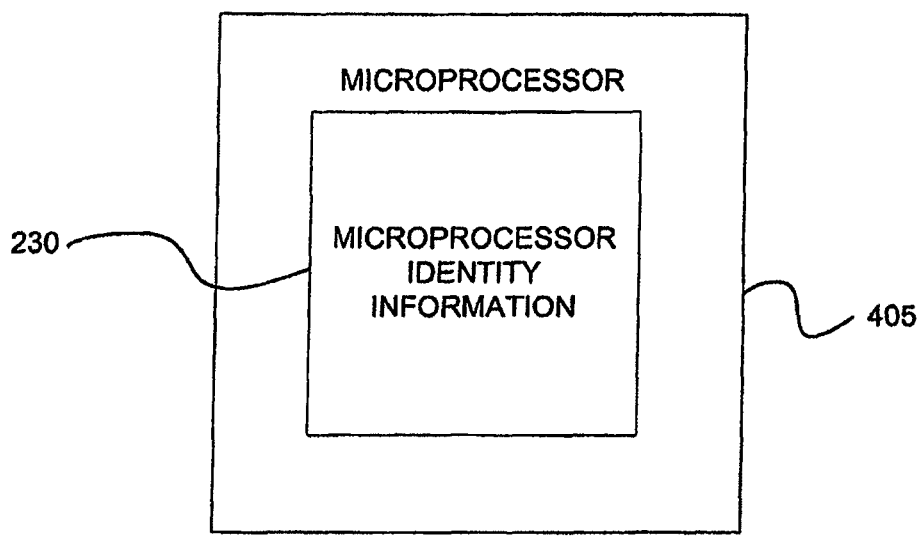
FIG. 4 is a schematic view illustrating an embodiment of the microprocessor identity device of FIG. 2.

Referring to FIG. 4, the microprocessor identity device 205 is a microprocessor component 405. The microprocessor component 405 includes the microprocessor identity information 230. The microprocessor component 405 is any commercially available microprocessor unit. The microprocessor identity information 230 is etched onto the microprocessor component 405 using any conventional etching method. The microprocessor identity information 230 is etched at the time the microprocessor component 405 is etched.

Figure 5:
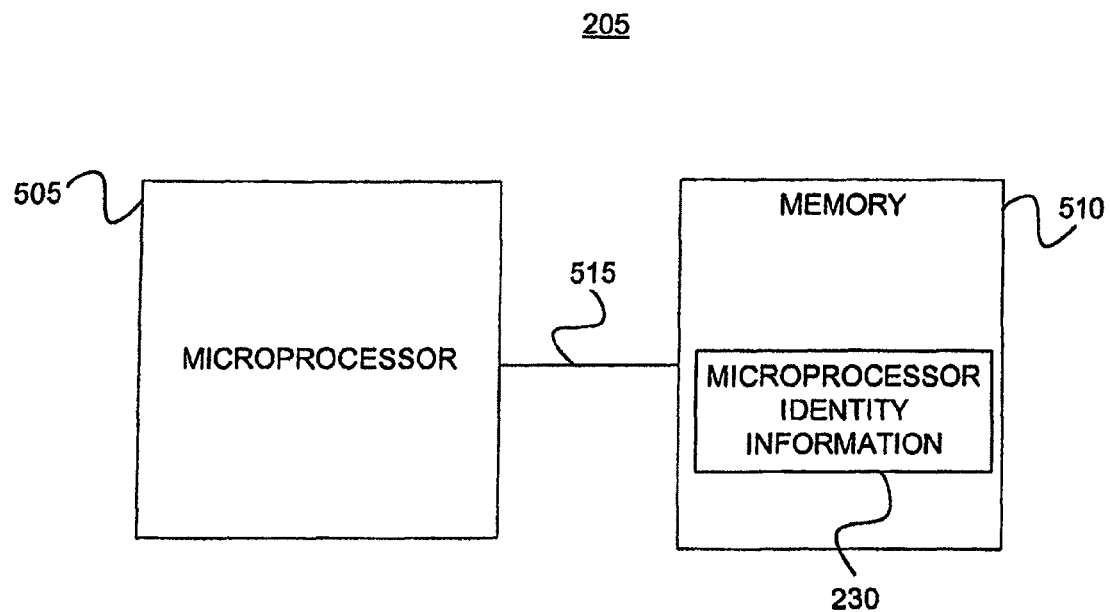
FIG. 5 is a schematic view of an alternate embodiment of the microprocessor identity device of FIG. 2.

Referring to FIG. 5, in an alternate embodiment, the microprocessor identity device 205 includes a microprocessor component 505, a memory 510, and one or more communication interfaces 515. The microprocessor component 505 is any commercially available microprocessor unit, for example, the low power Reduced Instruction Set Computing (RISC) processor available from a variety of U.S. or Japanese manufacturers.

The memory 510 is programmable, non-erasable, and read-only. The memory 510 is any commercially available memory, such as Programmable Read-Only Memory (PROM). The memory 510 includes the microprocessor identity information 230. The microprocessor identity information 230 is etched onto the memory 510 using any commercially available PROM programming device.

The communication interfaces 515 electrically couple the microprocessor component 505 and the memory 510. The communication interfaces 515 include address, data, and control electrical lines.

Figure 6:
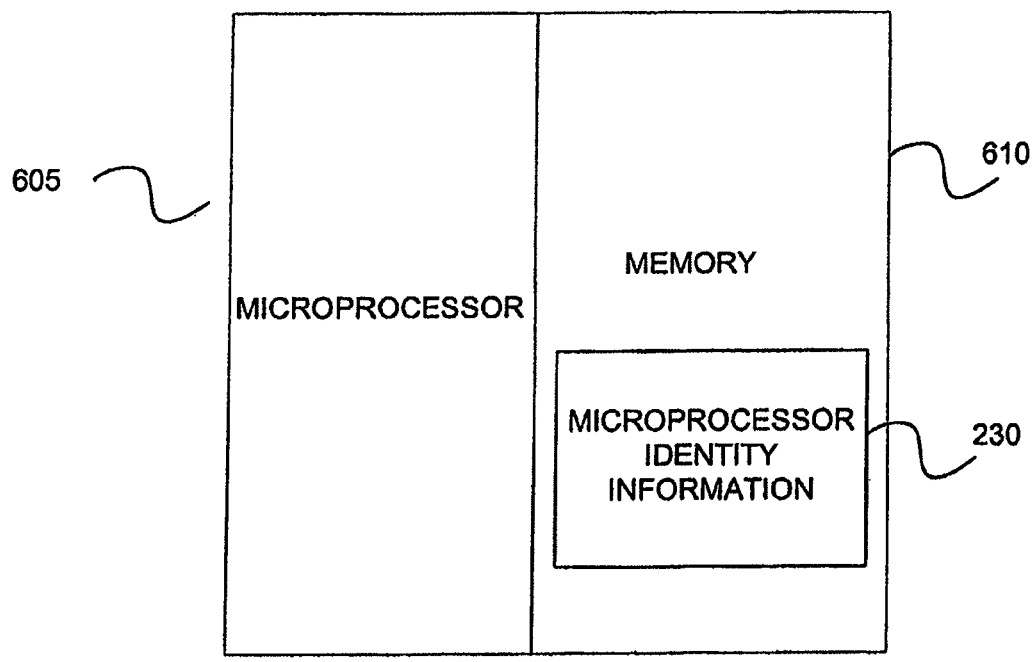
FIG. 6 is a schematic view of an alternate embodiment of the microprocessor identity device of FIG. 2.

Referring to FIG. 6, in another alternate embodiment, the microprocessor identity device 205 includes a microprocessor component 605. The microprocessor component 605 is any commercially available microprocessor unit, for example, such as the StrongARM RISC SA-1110 available from Intel, Inc. The microprocessor component 605 is specially manufactured to further include an on-die PROM memory 610. The memory 610 includes the microprocessor identity information 230. The microprocessor identity information 230 is etched onto the memory 610 using any standard means for programming. The microprocessor identity information 230 is etched at the time of manufacturing of the microprocessor component 605.

Figure 7:
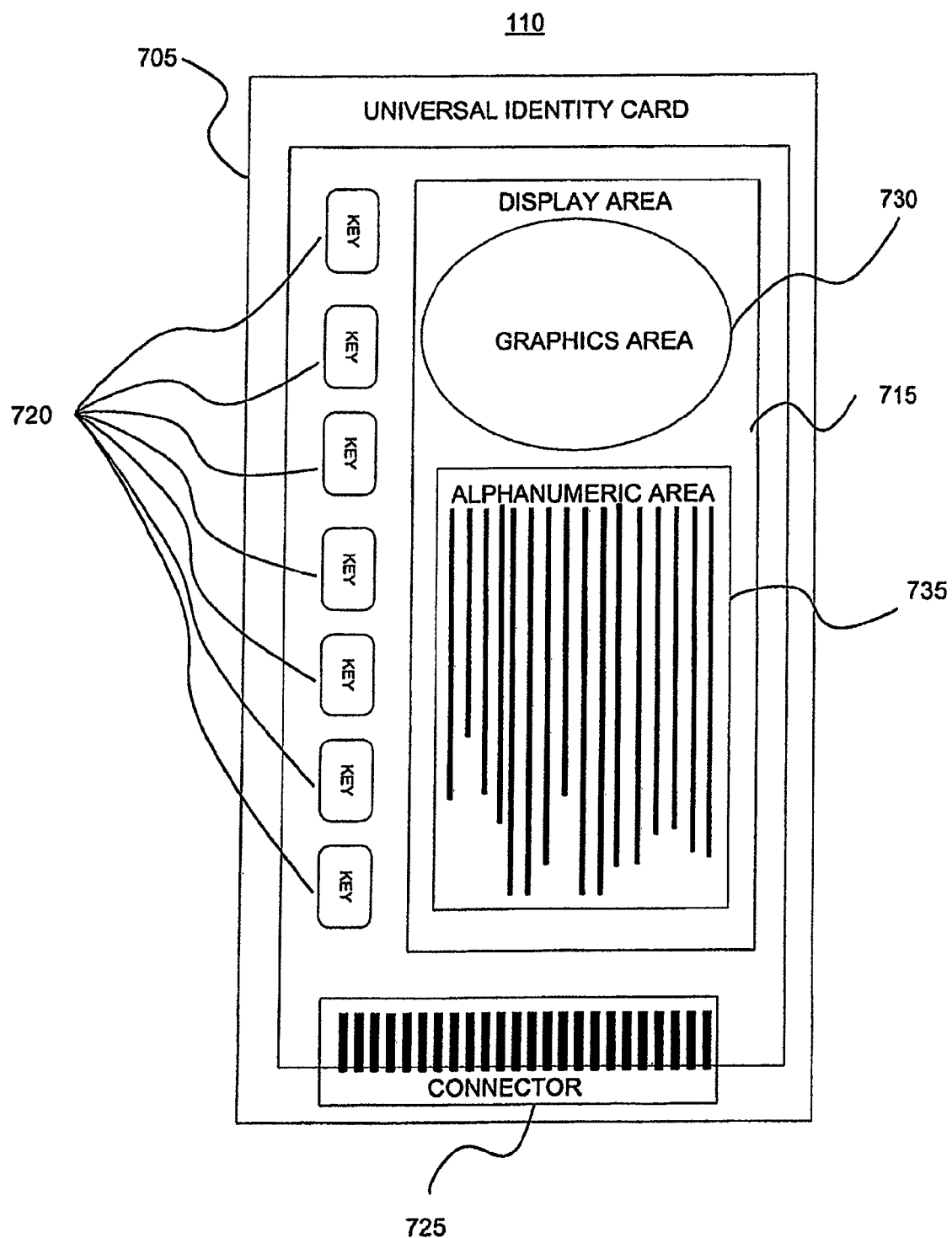
FIG. 7 is a schematic view of an embodiment of the computer card of FIG. 1.

Referring to FIG. 7, in an alternate embodiment, the computer card 110 is a Universal Identity Card (UID) 705. The UID 705 is the size of a standard credit card. The digital identity device 105 is embedded in the circuitry of the UID 705. The digital identity device 105 supplies intelligence to the UID 705 via the microprocessor identity device 205. The UID 705 includes a display area 715, one or more user keys 720, and a connector 725. The display area 715 is an LCD display. The display area 715 includes a graphics area 730 and an alphanumeric area 735. Current technology allows the display area 715 to display both graphics and alphanumeric data. The display area 715 is used to display, for example, photos, thumb prints, driver's license information, social security numbers, financial information from banks, and such other data as may be deemed appropriate in the future. The user keys 720 are used to enter information or user options. The information or user options that are entered include, for example, organizer type information such as appointments, phone numbers, and address book information. The connector 725 connects the UID 705 to one or more computers or systems 100. The connector 725 is a set of fins. In an alternate embodiment, the connector 725 may be pins, sockets, or other suitable connecting means appropriate to the computers or systems 100 it is being connected to. The connector 725 utilizes common connector standards such as PCMCIA, Universal Serial Bus (USB) and RS232. The UID 705 is any card used to access personal computers, ATMs, and other public transaction devices for electronic transactions. The digital identity device 105 validates systems 100 that request information from the UID 705. The digital identity device 105 stores relevant microprocessor identity information 230 or digital identity data 220 of the systems 100 to validate the systems 100 requests. The digital identity device 105 of the UID 705 also authenticates itself to other systems 100 that request information.

In an alternate embodiment, the display area 715 may be touch-sensitive and capable of inputting information, similar to the technology used by the Palm Pilot IIixe by Palm, Inc.

Figure 8:
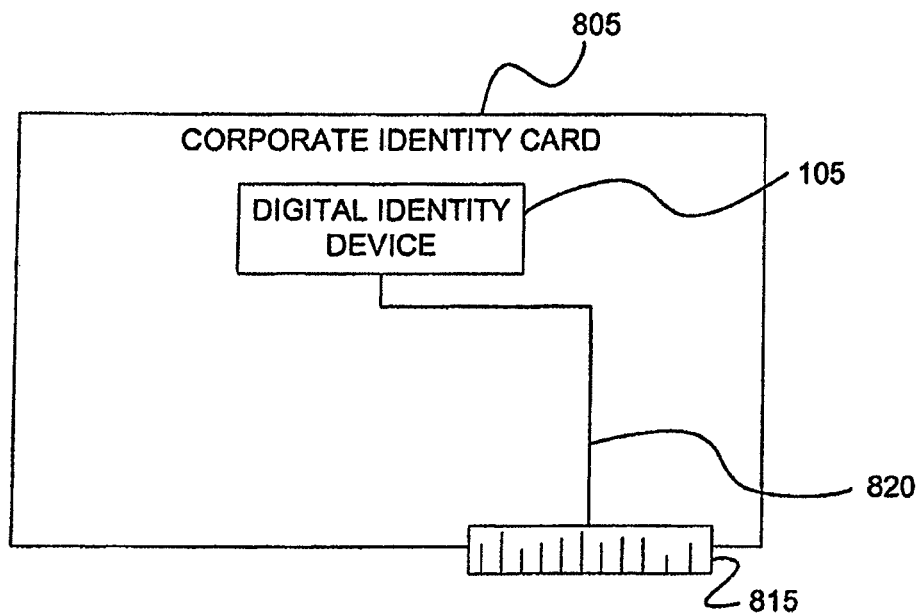
FIG. 8 is a schematic view of an alternate embodiment of the computer card of FIG. 1.

Referring to FIG. 8, in an alternate embodiment, the computer card 110 is a Corporate Identity Card 805. The Corporate Identity Card 805 is any commercially available computer card. The Corporate Identity Card 805 has the digital identity device 105 on-board. The Corporate Identity Card 805 includes a set of electrical fins 815 and a connector 820. The connector 820 connects the digital identity device 105 to the electrical fins 815. The electrical fins 815 couple the Corporate Identity Card 805 to a main computer bus. The electrical fins 815 are, for example, fins or other suitable connecting means. In a preferred embodiment, there is a single Corporate Identity Card 805 for a corporation. The Corporate Identity Card 805 validates all digital transactions of the corporation. The Corporate Identity Card 805 authenticates the corporation in all transactions to one or more systems 100.

In an alternate embodiment, the computer card 110 is a computer, such as a Personal Digital Assistant (PDA) like the Palm Pilot IIIxe available from Palm, Inc. The computer card 110 hosts the digital identity device 105. The computer card 110 uses the microprocessor identity device 205 for its computer functions. The digital identity device 105 may be, for example, in the form of a modified FlashCard. The FlashCard may be a form of NVRAM with PROM (Programmable Read-Only Memory).

In an alternate embodiment, documents in a computer are encrypted using the microprocessor identity information 230 or the digital identity data 220. Only by using the microprocessor identity information 230 or the digital identity data 220 can the documents be decrypted. This is known as a symmetric cryptographic system.

Figure 9:
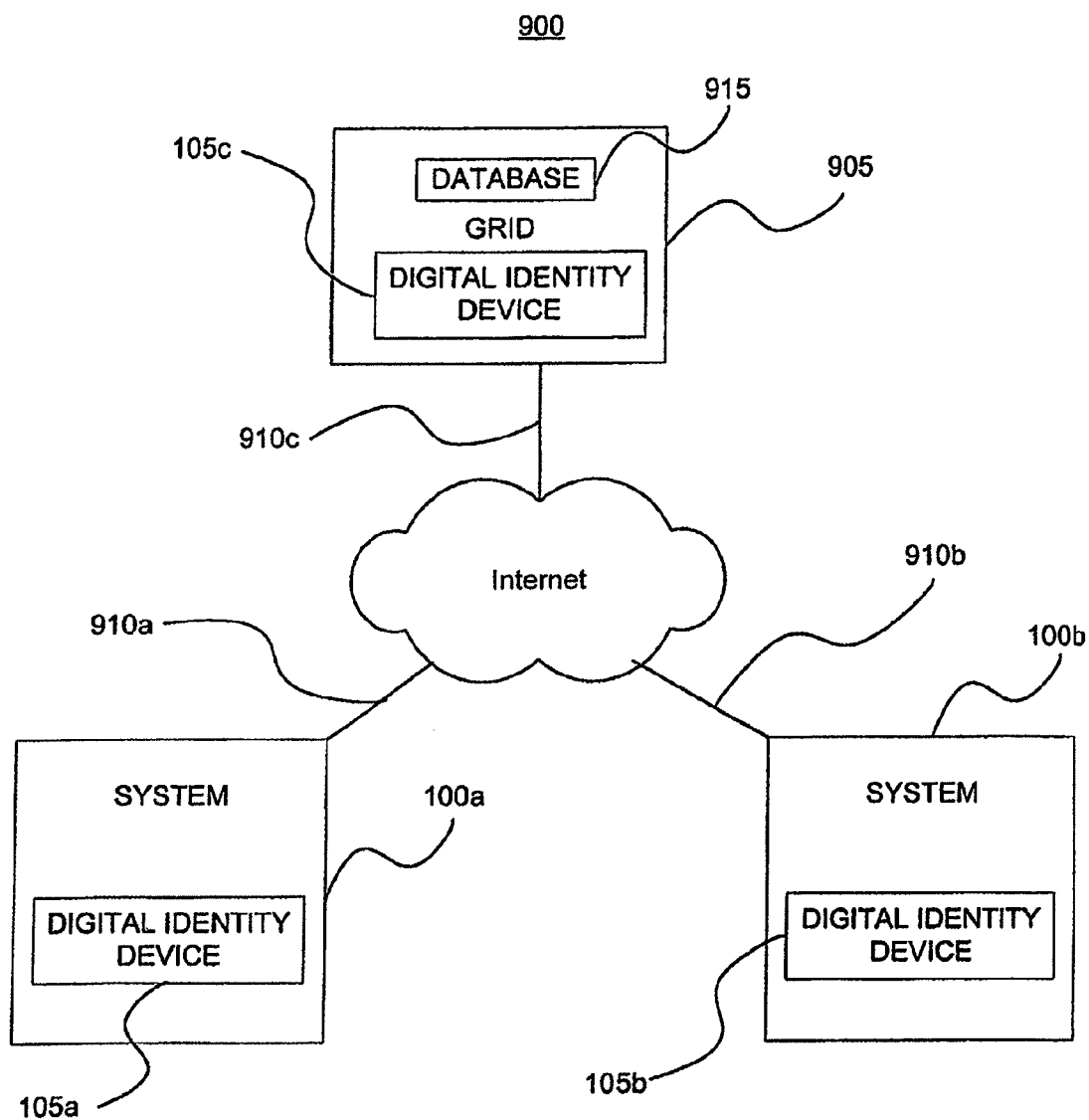
FIG. 9 is a schematic view of a system for globally authenticating the digital identity devices.

Referring to FIG. 9, a system 900 for registering and authenticating digital identities devices 105 include one or more systems 100, a Global Registry of Digital Identity Devices (GRID) 905, and one or more communication links 910 to the Internet.

The systems 100 include a digital identity device 105. In a preferred embodiment, there is a first system 100a with a first digital identity device 105a and a second system 100b with a second digital identity device 105b. The first system 100a and the second system 100b reside in separate computers. Each system 100 has unique digital identity data 220 and unique microprocessor identity information 230.

The GRID 905 is a computer. The GRID 905 includes a database 915 and a digital identity device 105c. The database 915 stores microprocessor identity information 230 and digital identity data 220 for all systems 100. The database 915 is formed by each digital identity device 105 registering with the GRID 905 using the communication links 910 to the Internet. The digital identity device 105c verifies and authenticates all communications between the systems 100. The GRID 905 is the universal keeper of all digital identity devices 105. If a digital identity device 105 is lost, the information within the digital identity device 105 is secure. Only the registered owner of the digital identity device 105 can extract the information within the digital identity device 105. Lost digital identity devices 105 are mailed to the administrator of the GRID 905 and are returned to the owner. The GRID 905 has minimal low security information that is not encrypted, such as name and address tied to the external markings of the digital identity devices 105 or to the microprocessor identity devices 205, to enable this function.

The communication links 910 couple the GRID 905 and the systems 100 to the Internet. The communication links 910 are only necessary when there is an exchange of information between the systems 100 and/or the GRID 905. In a preferred embodiment, the communication links 910 are Internet connections. There is a first communication link 910a coupling the first system 100a to the Internet, a second communication link 910b coupling the second system 100b to the Internet, and a third communication link 910c coupling the GRID 905 to the Internet. The systems 100 are coupled through the Internet directly. In an alternate embodiment, the systems 100 are coupled to the Internet via computers that host the digital identity devices 105.

Upon acquisition of the systems 100, the respective owners enter unique digital identity data 220 to the digital identity device 105. The digital identity data 220 is entered directly onto the digital identity device 105 using the system 100 or by attaching the system 100 to an external computer and using communication links 910. A user of the system 100 determines the digital identity data 220 necessary to identify the owner of the system 100. The user of the system 100 also determines levels of security for the system 100. The system 100 transmits the digital identity data 220 and the microprocessor identity information 230 via the communication links 910 to the GRID 905 via the Internet. An administrator of the GRID 905 verifies the digital identity data 220 provided by the owners of the system 100. The database 915 stores the digital identity data 220 and the microprocessor identity information 230 of the system 100. The GRID 905 may be used by the system 100 as a backup to the digital identity data 220 and the microprocessor identity information 230. This backup is useful for restoring the digital identity information 220 in case of loss of the system 100, a hard reset, or inadvertent erasure of data.

Figure 10:
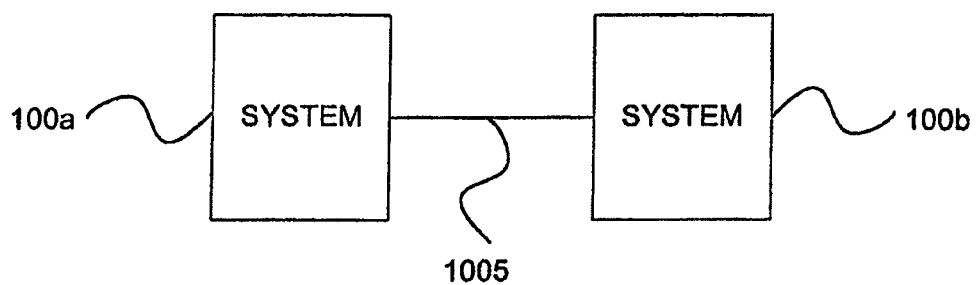
FIG. 10 is a schematic view of a system for communication between one or more of the digital identity devices of FIG. 1.

Referring to FIG. 10, a system 1000 for transactions between digital identities includes one or more systems 100 and one or more communication links 1005. There is a first system 100a and a second system 100b coupled by the communication link 1005. The communication link 1005 is any communication means, for example, an Internet connection, keycard access, or an ATM digital identity device jack. The digital identity data 220 of the systems 100 include information that are particular to the individuals or corporations involved in the transactions. The individual digital identity devices 105 allows only authorized access to the digital identity data 220 of each system 100. The authorized access to the digital identity data 220 of each system 100 is relayed to the GRID 905 during set up of the database 915. The system 100 is used for transactions, such as, Internet retailing, banking, business-to-business, electronic permission, and secure communications. This would be similar to the process of establishing an account with a bank or establishing credit with a financial institution. The digital identity devices 105 contain information for the transactions, for example, bank balances, credit card balances, payments, electronic travelers checks, and security transactions.

In an alternate embodiment, the transaction may be electronic communication, for example, e-mail. A digital signature encrypts the e-mail. The digital signature may be the microprocessor identity information 230. The systems 100 authenticate the e-mail by decrypting the e-mail using the previously stored security access maintained in the GRID 905 or in the digital identity device.

Figure 11A:
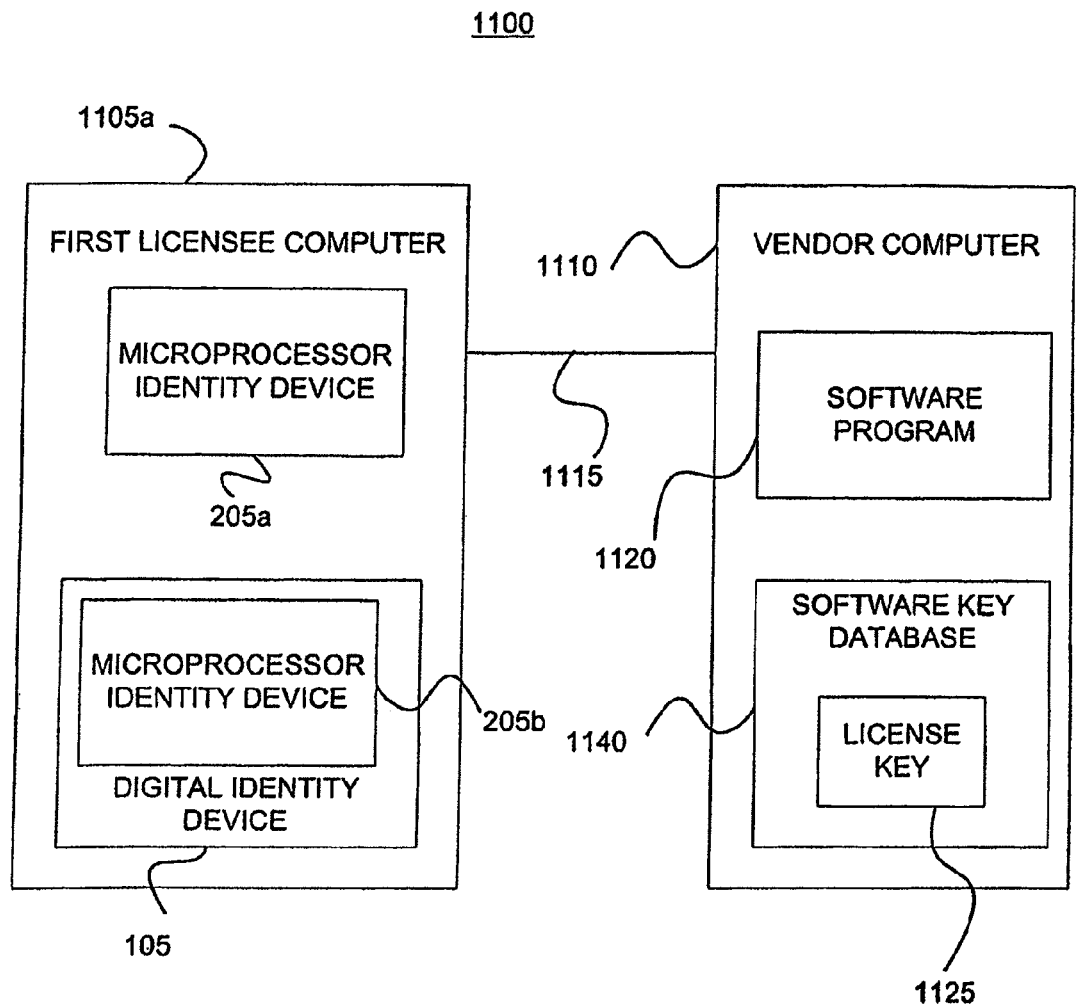
FIG. 11A is a schematic view of a system for licensing software.

Referring to FIG. 11A, a system 1100 for licensing software includes a first licensee computer 1105a, a vendor computer 1110, and a connection 1115. The connection 1115 couples the licensee computer 1105 to the vendor computer 1110. The connection 1115 is the Internet.

The first licensee computer 1105a includes a first microprocessor identity device 205a and a digital identity device 105. The digital identity device 105 includes a second microprocessor identity device 205b. The microprocessor identity devices 205 include the microprocessor identity information 230 for their respective microprocessor identity devices 205.

The vendor computer 1110 includes a software program 1120 and a software key database 1140. The software program 1120 is distributed via the Internet. In an alternate embodiment, the software program 1120 is distributed via a CD-ROM or some other media.

The software key database 1140 is generated by the vendor computer 1110 and contains one or more license keys 1125 available for installation. Each license key 1125 has a one-to-one relationship with a copy of the software program 1120. After installation, the license key 1125 binds the microprocessor identity information 230 of the first licensee computer 1105a in the software key database 1140. In an alternate embodiment, the microprocessor identity information 230 is encrypted using an algorithm that uses the license key 1125 in the arguments.

The connections 1115 are any data connection used to transfer information between computers, for example, an Internet connection. In an alternate embodiment, the connection 1115 is a high-speed data connection.

Figure 11B:
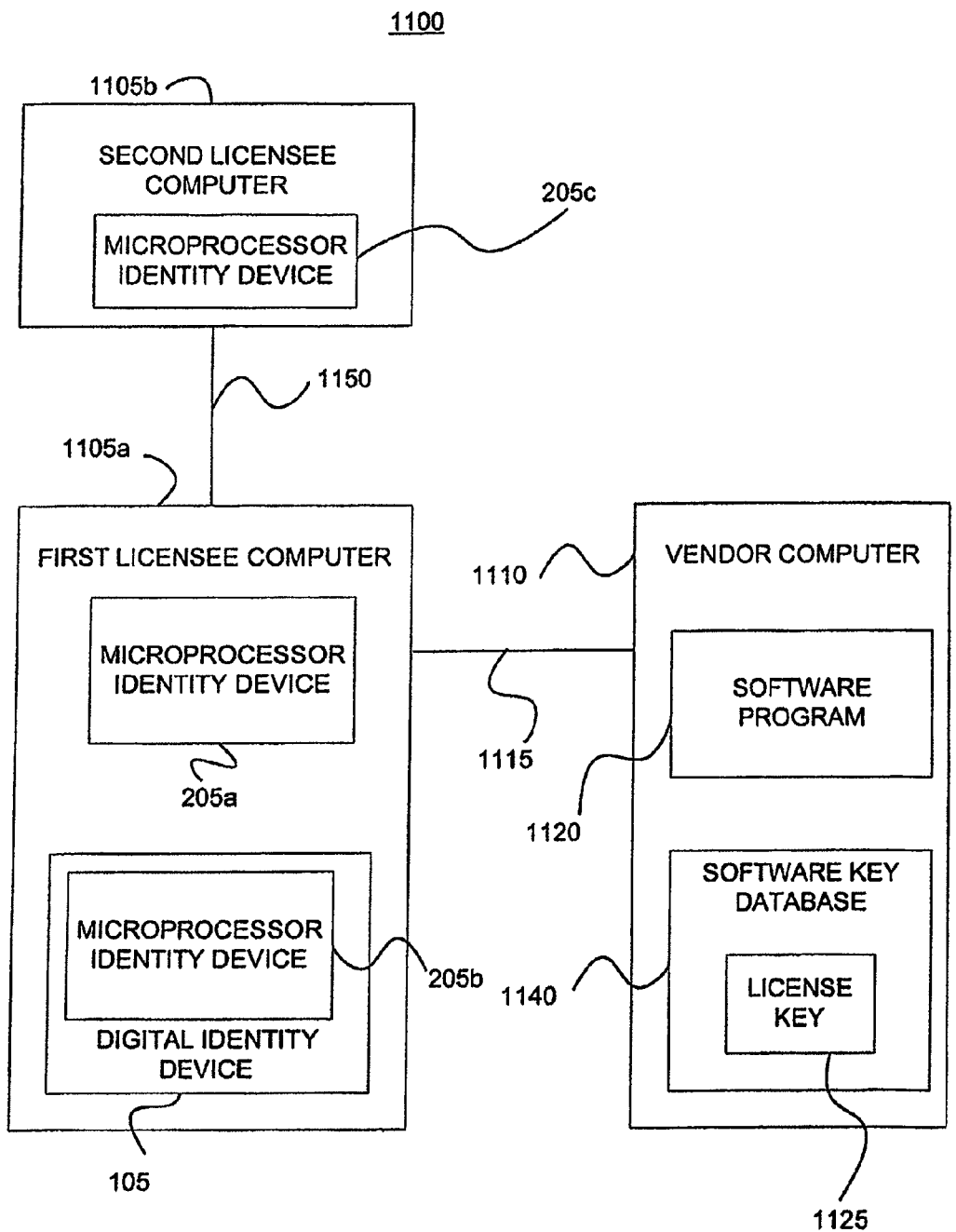
FIG. 11B is a schematic view of an alternate system for licensing software.

Referring to FIG. 11B, in an alternate embodiment, the system 1100 further includes a second licensee computer 1105b and an internal network connection 1150. The second licensee computer 1105b includes a third microprocessor identity device 205c. The second licensee computer 1105b is coupled to the first licensee computer 1105a by the internal network connection 1150.

In an alternate embodiment, the second licensee computer 1105b is directly coupled to the connection 1115. The second licensee computer 1105b operates through a gateway controlled by the first licensee computer 1105a.

Figure 12:
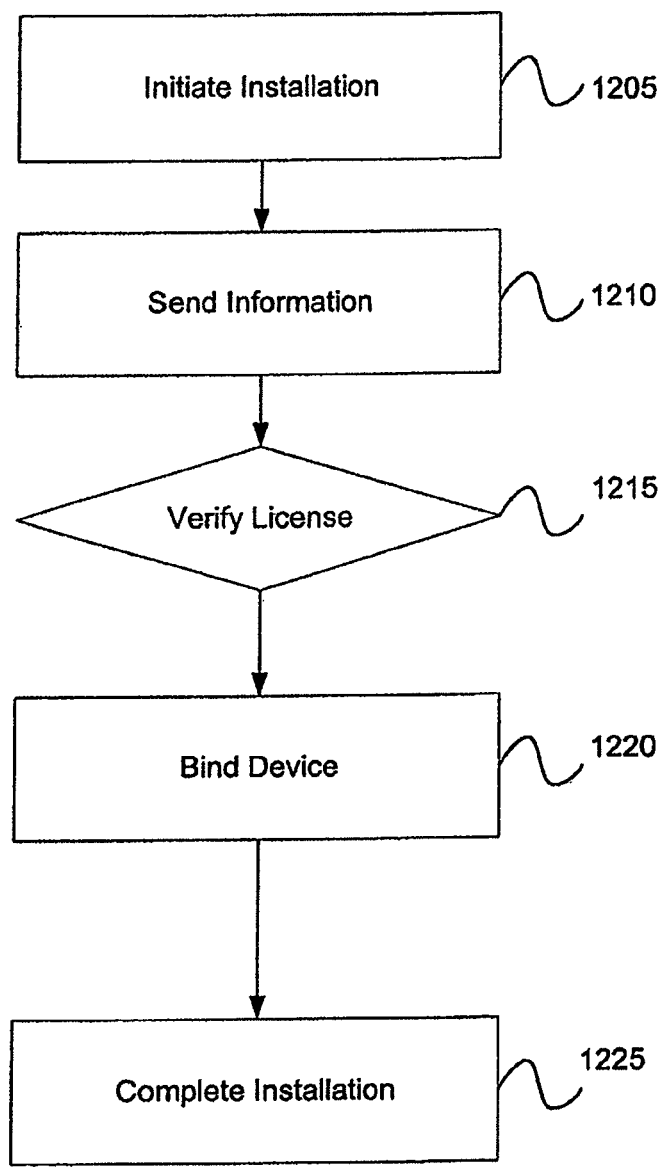
FIG. 12 is a schematic view of a method for licensing software, using the system of FIG. 11A.

Referring to FIG. 12, a method 1200 for licensing software includes: in step 1205, initiating the software installation; in step 1210, sending information; in step 1215, verifying the license status; in step 1220, binding information; and in step 1225, completing the installation. The method 1200 may be used to license software to a computer, an individual, or a corporation.

In step 1205, the first licensee computer 1105a initiates the installation process by downloading the software program 1120 via the connection 1115. The installation process is automatically initiated by the downloading process.

In an alternate embodiment, the first licensee computer 1105a initiates the installation process by running a setup program within the software program 1120.

In step 1210, the first licensee computer 1105a sends the microprocessor identity information 230 of the microprocessor identity device 205a and the license key 1125 to the vendor computer 1110 via the connection 1115. The license key 1125 issues to the first licensee computer 1105a during step 1205. The software program 1120 licenses to the first licensee computer 1105a.

In an alternate embodiment, the software license key 1125 issues on the software media or a container for the software media.

In an alternate embodiment, the first licensee computer 1105a sends the microprocessor identity information 230 of the microprocessor identity device 205b and the license key 1125 to the vendor computer 1110 via the connection 1115. The software program 1120 licenses to the digital identity device 105.

In step 1215, the vendor computer 1110 verifies the microprocessor identity information 230 from the first licensee computer 1105a. The vendor computer 1110 confirms the presence of the license key 1125 in the software key database 1140 to determine if the license key 1125 is valid. The vendor computer 1110 further determines if the license key 1125 is already coupled in the software key database 1240. If coupled, there may be a breach of the licensing agreement. The vendor computer 1110 requests alternate microprocessor identity information 230 from the first licensee computer 1105a and establishes multiple links to the license key 1125. In an alternate embodiment, the vendor computer 1110 halts the method 1200 if the license key 1125 is coupled. In an alternate embodiment, the vendor computer 1110 chooses to halt the method 1200 and take actions outside this automated licensing method 1200.

In step 1220, the vendor computer 1110 binds the license key 1125 to the microprocessor identity information 230. The software key database 1140 associates the microprocessor identity information 230 to the license key 1125. The microprocessor identity device 205a is encrypted using the license key 1125. In an alternate embodiment, the license key 1235 is encrypted using the microprocessor identity device 205a.

In step 1225, the first licensee computer 1105a completes the installation of the software program 1120. The first licensee computer 1105a also stores the bound microprocessor identity information 230 and the license key 1125 from step 1220.

In an alternate embodiment, if the licensee agreement allows, a second licensee computer 1105b installs the software program 1120 from the first licensee computer 1105a using the method 1200. The software key database 1140 associates the microprocessor identity information 230 of the microprocessor identity device 205a, 205b, or 205c to the license key 1125. The association of the license, whether to the first licensee computer 1105a or the digital identity device 105, is determined by the licensing terms of the software program 1120.

In an alternate embodiment, the method 1200 applies to other types of intellectual property, such as MP3 music, which runs on computers with microprocessor identity devices 205.

Figure 13:
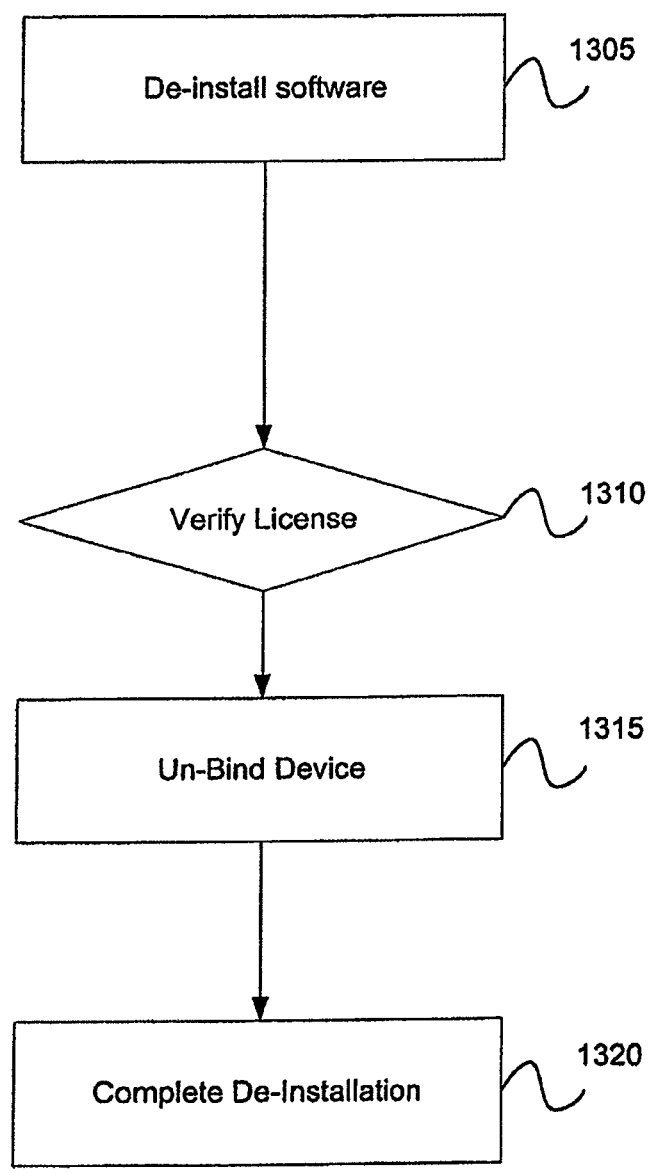
FIG. 13 is a schematic view of a method for de-licensing software using the system of FIG. 11A.

Referring to FIG. 13, a method 1300 for de-licensing software includes: in step 1305, de-installing software; in step 1310, verifying the license status; in step 1315, un-binding identity device and software license key; and in step 1320, completing de-installation. The method 1300 is the logical reverse of the method 1200.

In step 1305, the first licensee computer 1105a starts the de-installation of the software program 1120. The software program 1120 is de-installed using a standard de-installation program supplied by the vendor. The first licensee computer 1105a transmits the license key 1125 and the microprocessor identity information 230 to the vendor computer 1110 via the connection 1115.

In an alternate embodiment, the first licensee computer 1105a sends the microprocessor identity information 230 of the microprocessor identity device 205b and the license key 1125 to the vendor computer 1110 via the connection 1115.

In an alternate embodiment, the second licensee computer 1105b sends the microprocessor identity information 230 of the microprocessor identity device 205c and the license key 1125 to the vendor computer 1110 via the first licensee computer 1105a.

In step 1310, the vendor computer 1110 verifies the binding of the license key 1125 and the microprocessor identity information 230 in the software key database 1140. If the license key 1125 and the microprocessor identity information 230 do not match the values stored in the software key database 1140, the vendor computer 1110 halts the method 1300. In an alternate embodiment, there are other corrective actions the vendor computer 1110 may take to correct an exception to its licensing agreement.

In step 1315, the vendor computer 1110 un-binds the license key 1125 to the microprocessor identity information 230 in the software key database 1140. The software key database 1140 un-associates the microprocessor identity information 230 to the license key 1125. The software key database 1140 leaves a blank field for the microprocessor identity information 230.

In step 1320, the vendor computer 1110 completes the reinstallation process by updating the software key database 1140. The first licensee computer 1105a removes the software program 1120.

In an alternate embodiment, the second licensee computer 1105b performs the method 1300 to de-install the software program 1120. The method 1300 de-installs the software from the second licensee computer 1105b, but not the first licensee computer 1105a (such as in a private network).

In a networked environment, the methods 1200 and 1300 are done on an individual computer basis, especially when software resides on the computers in which they are used.

Figure 14:
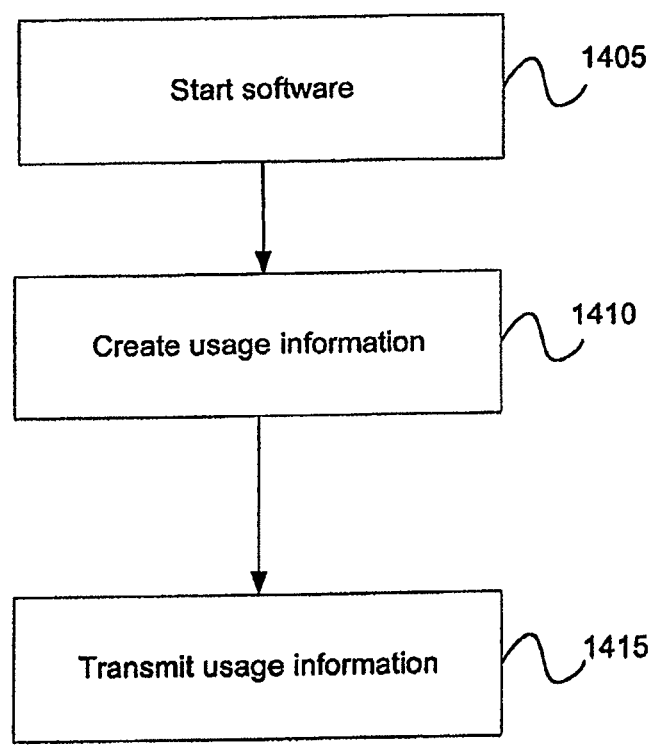
FIG. 14 is a schematic view of a method for monitoring software usage using the system of FIG. 11A.

Referring to FIG. 14, a method 1400 for tracking software usage includes: in step 1405, starting the software; in step 1410, creating usage information; and in step 1415, transmitting the usage information. Tracking software usage determines licensing fees by the vendor computer 1110. The method 1400 assumes the first licensee computer 1105a has already performed the method 1200.

In step 1405, the first licensee computer 1105a starts and uses the software program 1120.

In step 1410, the software program 1120 creates usage information. The usage information may include, for example, start time, stop time, and users.

In an alternate embodiment, the usage information is stored in a file on the first licensee computer 1105a.

In step 1415, the first licensee computer 1105a transmits the usage information to the vendor computer 1110 via the connection 1115.

In an alternate embodiment, the first licensee computer 1105a transmits the file of the usage information when the connection 1115 is in place. The first licensee computer 1105a further deletes the file after transmission to prevent backlogs of old files.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A digital identity device comprising:
a microprocessor;
microprocessor identity information that uniquely identifies the digital identity device; and
digital identity data that identifies an owner of the digital identity device, the digital identity data being bound to the digital identity device by encrypting the digital identity data using an algorithm that uses the microprocessor identity information.

2. The digital identity device of claim 1, wherein the microprocessor identity information is a mathematically generated number that satisfies certain encryption criteria.

3. The digital identity device of claim 1, wherein the microprocessor identity information is a series of alphanumeric characters that satisfies certain encryption criteria.

4. The digital identity device of claim 1, wherein the digital identity data comprises a password provided by the owner.

5. The digital identity device of claim 1, wherein the digital identity data is stored in a database that is external to the digital identity device.

6. The digital identity device of claim 1, wherein the microprocessor identity information is stored in a database that is external to the digital identity device.

7. A digital identity device comprising:
a microprocessor;
microprocessor identity information that uniquely identifies the microprocessor; and
digital identity data that identifies an owner of the digital identity device, the digital identity data being bound to the microprocessor identity information,
wherein when the owner provides the digital identity data, the owner establishes ownership of the digital identity device by use of an encryption algorithm that binds the digital identity data with the microprocessor identity information.

8. The digital identity device of claim 7, wherein the microprocessor identity information is at least one selected from a group consisting of a mathematically generated number that satisfies certain encryption criteria and a series of alphanumeric characters that satisfies certain encryption criteria.

9. The digital identity device of claim 7, wherein the digital identity data comprises a password provided by the owner.

10. The digital identity device of claim 7, wherein the digital identity data is stored in a database that is external to the digital identity device.

11. The digital identity device of claim 7, wherein the digital identity data is bound with the microprocessor identity information by encryption of the digital identity data with the microprocessor identity information.

12. A digital identity device comprising:
a microprocessor;
microprocessor identity information that uniquely identifies the microprocessor; and
digital identity data that identifies an owner of the digital identity device, the digital identity data being encrypted with an algorithm that uses the microprocessor identity information.

13. The digital identity device of claim 12, wherein the digital identity device further includes a memory operably connected to the microprocessor and configured to store the digital identity data.

14. The digital identity device of claim 12, wherein the digital identity data identifies an owner of a system associated with the digital identity device.

15. A digital identity device comprising:
a microprocessor;
microprocessor identity information that uniquely identifies the microprocessor; and
digital identity data that identifies an owner of the digital identity device, the digital identity data being encrypted with the microprocessor identity information when the owner establishes ownership of the digital identity device.

* * * * *